United States Patent
Sowa et al.

(10) Patent No.: US 9,402,166 B1
(45) Date of Patent: Jul. 26, 2016

(54) METHOD AND APPARATUS FOR ASSIGNING A TALK GROUP TO A RADIO WITHIN A COMMUNICATION SYSTEM

(71) Applicant: MOTOROLA SOLUTIONS, INC, Schaumburg, IL (US)

(72) Inventors: Hans C Sowa, Schaumburg, IL (US); Daniel J. McDonald, Cary, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/591,420

(22) Filed: Jan. 7, 2015

(51) Int. Cl.
*H04W 4/08* (2009.01)
*H04W 76/00* (2009.01)

(52) U.S. Cl.
CPC .............. *H04W 4/08* (2013.01); *H04W 76/002* (2013.01)

(58) Field of Classification Search
CPC ..... H04W 4/10; H04W 74/00; H04W 76/005; H04W 76/023
USPC .................................................. 455/517–519
See application file for complete search history.

(56) References Cited

U.S. PATENT DOCUMENTS

| | | | |
|---|---|---|---|
| 5,235,631 A * | 8/1993 | Grube ................... | H04W 84/08 455/17 |
| 5,279,521 A | 1/1994 | Johlie et al. | |
| 5,613,209 A | 3/1997 | Peterson et al. | |
| 6,498,787 B1 * | 12/2002 | Yi .......................... | H04M 15/58 370/328 |
| 6,882,856 B1 * | 4/2005 | Alterman ............... | H04W 84/08 370/312 |
| 9,232,365 B1 * | 1/2016 | Mansour ................. | H04W 4/10 |
| 2004/0190496 A1 * | 9/2004 | Albal ...................... | H04M 3/56 370/352 |
| 2008/0161029 A1 | 7/2008 | McDonald et al. | |
| 2008/0205321 A1 * | 8/2008 | Martinez ............... | H04L 12/189 370/312 |
| 2009/0288162 A1 * | 11/2009 | Shaffer ............... | H04L 63/1458 726/22 |
| 2009/0327435 A1 * | 12/2009 | LoGalbo ............... | H04W 60/00 709/206 |
| 2010/0165904 A1 | 7/2010 | Woodward et al. | |
| 2012/0155644 A1 | 6/2012 | Wealleans et al. | |
| 2012/0230254 A1 * | 9/2012 | Otamendi ............... | H04L 12/66 370/328 |
| 2013/0059622 A1 * | 3/2013 | Agulnik .................. | H04W 4/08 455/518 |
| 2013/0157558 A1 | 6/2013 | Wiatrowski | |
| 2013/0324095 A1 * | 12/2013 | Namm .................. | H04L 65/403 455/416 |
| 2015/0147990 A1 * | 5/2015 | Kreitzer ................... | H04B 1/16 455/132 |
| 2015/0148034 A1 * | 5/2015 | Roussev .............. | H04W 60/005 455/434 |
| 2015/0172874 A1 * | 6/2015 | Lin ......................... | H04W 4/08 455/518 |
| 2015/0172875 A1 * | 6/2015 | Lin ......................... | H04W 4/08 455/518 |

* cited by examiner

*Primary Examiner* — Bobbak Safaipour

(57) ABSTRACT

A method and apparatus for assigning a talk group to a radio within a communication system is provided herein. During operation a router receives a communication from a radio over a channel. The communication uses a first talk group that is not assigned to the channel. In response, the router will forward identification information for the user over the channel using a pre-arranged second talk group. Once communication is received using the second talk group (at, for example a console), the receiver will program the radio with an appropriate talk group.

10 Claims, 5 Drawing Sheets

*200*

- 
- 
-

CHANNEL 23
TG10
TG11
TG12
TG13- COMTG
TG14- CHANNEL WIDE

CHANNEL 24
TG15
TG16
TG17
TG18- COMTG
TG19- CHANNEL WIDE

CHANNEL 25
TG40
TG41
TG42
TG43- COMTG
TG44- CHANNEL WIDE

METHOD AND APPARATUS FOR ASSIGNING A TALK GROUP TO A RADIO WITHIN A COMMUNICATION SYSTEM

FIELD OF THE INVENTION

The present invention generally relates to talk group assignment, and more particularly to a method and apparatus for assigning a talk group to a radio within a communication system.

BACKGROUND OF THE INVENTION

In a two-way radio system, each radio typically communicates with one group of radios (talk group) at a time. For example, a firefighter may be affiliated with or using a firefighter talk group and a police officer may be affiliated with or using a police talk group. Radios can also use Selective Squelch to listen their talkgroup without hearing others. A conventional traffic channel may be limited to a particular number of talk groups. For example, an ASTRO25 communication system from Motorola Solutions, Inc. can employ up 20 talk groups on a single traffic channel (transmit frequency). Other talk groups (outside of those 20) will not be heard by other radios or consoles. This can become an issue if a radio is not programmed with the current talk groups utilized for a particular channel.

For example, consider a situation where a user wishes to contact a dispatch center on a channel using a radio that is not programmed with the latest talk groups for that channel. The user's transmissions will not be heard. It would be beneficial if the user's radio can be quickly assigned a talk group so that their transmissions can be heard. Therefore, a need exists for a method and apparatus for assigning a talk group to a radio within a communication system that alleviates the above-mentioned issue.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 illustrates a database defining channels with their associated talk groups.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for assigning a talk group to a radio within a communication system is provided herein. During operation a router receives a communication from a radio over a channel. The communication uses a first talk group that is not assigned to the channel. In response, the router will forward identification information for the user over the channel using a pre-arranged second talk group. Once communication is received using the second talk group (at, for example a console), the receiver will program the radio with an appropriate talk group.

In one embodiment, the console will program the radio with the appropriate talk group by sending a regroup command to the radio. This may be done automatically, or alternatively, the by a counsel operator. For example, an alarm may sound whenever the second talk group is used, alerting the operator to regroup the radio. It should be noted that the originally transmitted voice over the first talk group will not be retransmitted on the reserved (second) talk group, although in alternate embodiments it may be.

Once the radio has been regrouped, an appropriate talk group may be used to communicate between the console operator and the user of the radio. The console operator and the user may then discuss what talk group the subscriber user should use on that channel. The console operator may again dynamically regroup the radio to a conventional talk group that the radio will use.

It should be noted that the reserved, second talk group is not anassigned to a user of the system until that user transmits on an unknown talk group. Therefore, the second talk group may be thought of as reserved, known, and unassigned. This talk group may also be referred to below as comTG.

Figure 1:
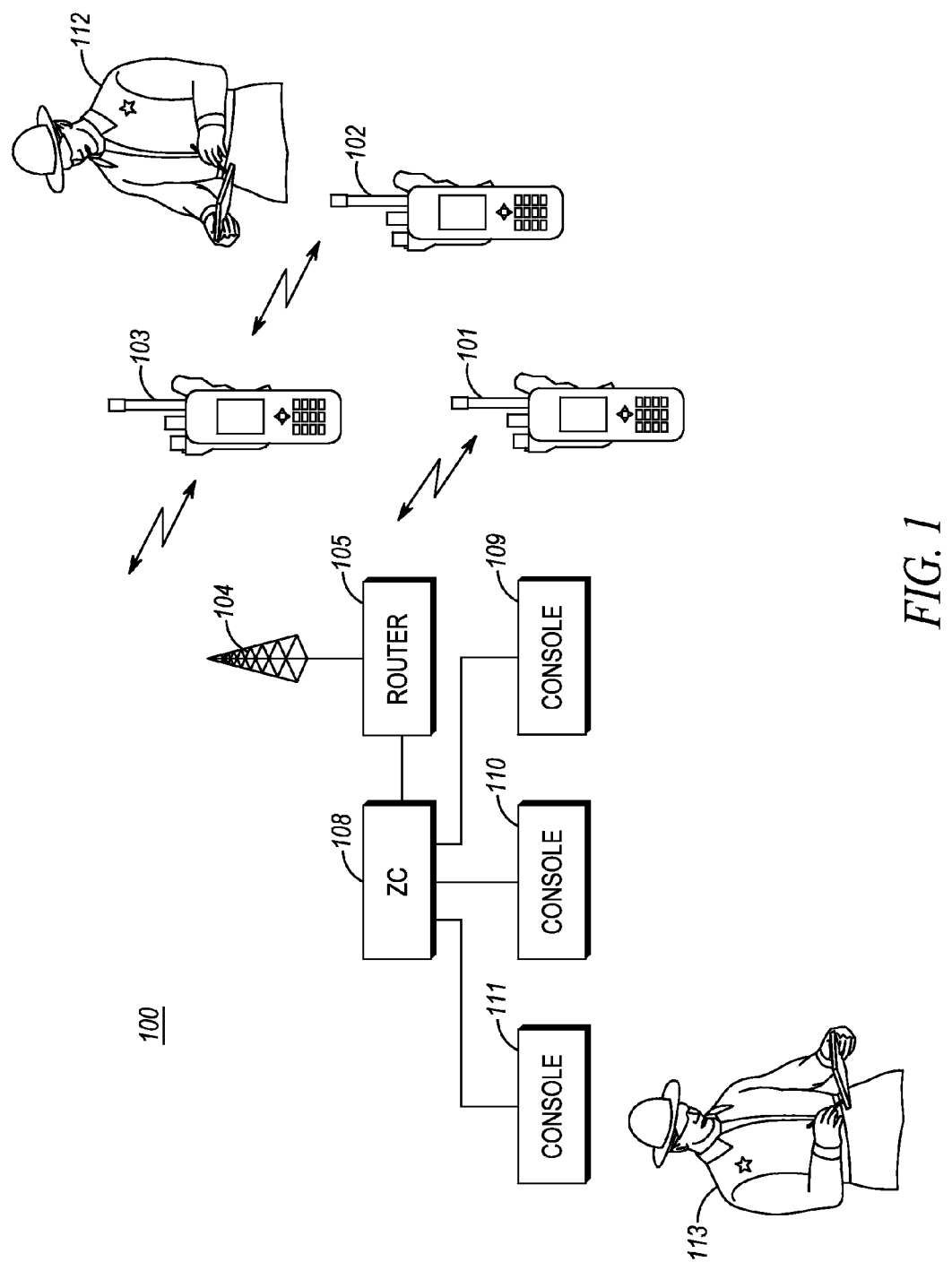
FIG. 1 illustrates a general operating environment for the present invention.

FIG. 1 illustrates a general operating environment for the present invention. As shown, several radios (subscriber units) 101-103 are shown in communication with base station 104. Radios 101-103 can be any portable electronic device that is associated with a particular person 112, including but not limited to a standalone two-way radios, a display or monitor, a handheld computer, a tablet computer, a mobile phone, a police radio, a media player, a personal digital assistant (PDA), a GPS receiver, or the like, including a combination of two or more of these items. Each radio 101-103 may transmit and receive over a particular channel using any number of talk groups. Any transmission by radios 101-103 will at least include a talk group identifier and a radio identifier. As discussed, that talk group identifier will identify a particular talk group associated with the transmission, while the radio identifier uniquely identifies the radio making the transmission.

Still referring to FIG. 1, in an exemplary embodiment, system 100 includes at least one zone controller 108 and at least one site (base station) 104. The zone controller 108 generally represents a server or another computing device that is communicatively coupled to router 105 (e.g., via a direct physical interface, a wireless interface, a computer network or another communications network) and provides centralized control and/or management of one or more zones within the system 100. In this regard, a zone managed or otherwise controlled by the zone controller 108 should be understood as referring to a portion of a geographic coverage area of system 100 that corresponds to one or more base stations 104 associated with zone controller 108. Base station 104 generally represents the transceivers, amplifiers, antennas, controllers, and/or other hardware configured to transmit, repeat, and/or receive radio frequency signals and convert received radio frequency signals to and/or from baseband signals for transmission to and/or from the zone controller 108.

Router (or gateway) 105 preferably comprises a device that forwards transmissions received from at least base station 104 to an appropriate zone controller 108. In one embodiment of the present invention, router 105 comprises a Conventional Channel Gateway (CCGW) from Motorola Solutions, Inc.

Finally, consoles 109-111 are configured to act as a communications client of base station 104 In addition consoles 109-111 provide administrative control radios 101-103 so that an administrator 113 may update operational parameters of radios 101-103. Such operational parameters include programming radios 101-103 with talk groups to use for particular channels. This programming will preferably take place via a dynamic regrouping as known in the art. With the dynamic regrouping feature, system controller or dispatcher 113 may notify radios affiliated with a first group (via a regroup command), of a second group so that the radios can seamlessly communicate via the second common group. Thus, dispatcher 113 is capable of remotely redirecting individual radios 101-103 to talk group, without any intervention from radio operators 112.

As discussed above, a conventional traffic channel within many communication systems is limited to a particular number of talk groups. For example, an ASTRO25 communication system from Motorola Solutions, Inc. can employ up 20 talk groups on a single traffic channel (transmit frequency). Other talk group calls transmitted over the channel will not be heard. This can become an issue if a radio is not programmed with the current talk groups utilized for a particular channel. In order to address this issue, when router 105 receives a communication from a radio, it will determine a particular channel and a particular talk group used by the radio to transmit the communication Router 105 will then access a table to determine if the particular talk group is currently associated with the particular channel. If the particular talk group is currently associated with the particular channel, the communication will be routed accordingly. However, if the particular talk group is not currently associated with the particular channel, router 105 will transfer radio identification information to a console on a second reserved talk group. This will trigger the console to re-program the radio to use the second talk group to communicate with the console.

It should be noted that voice transmissions by radios have the talkgroup ID and unit ID embedded in it. The router picks this information up from the voice stream and sends a control message to the zone controller using the reserved talk group (comTG). The zone controller knows which consoles have affiliated to the comTG and sends the control message to them. The router does not forward the actual voice stream since the zone controller doesn't start a call with the consoles. In this particular embodiment the zone controller just sends a control message to the consoles.

FIG. 2 illustrates a database defining channels with their associated talk groups. In the system described in FIG. 1, it is assumed that both router 105 and at least one console 109-111 contain the database shown in FIG. 2. As shown in FIG. 2, database 200 comprises a plurality of channels (e.g., channels 23, 24, and 25) along with allowed talk groups for those channels. As an example only, database 200 shows that channel 23 will only allow talk groups 10-14 to be utilized on that particular channel, while talk groups 15-19 may be used on channel 24. As mentioned above, the comTG and channel wide TG use different talkgroup IDs on different channels.

For channel 23, talk group 13 is utilized to notify any console that an inappropriate talk group was used on a particular channel. Thus, when a console is alerted to a transmission on a particular channel using talk group 13, the console will "know" that a radio attempted to transmit on the particular channel using a non-allowed talk group. Because radio identification information will also be received with the transmission of talk group 13, the radio may be "re-programmed" by the console to use talk group 13 so that communication between the radio and the console may take place.

Figure 3:
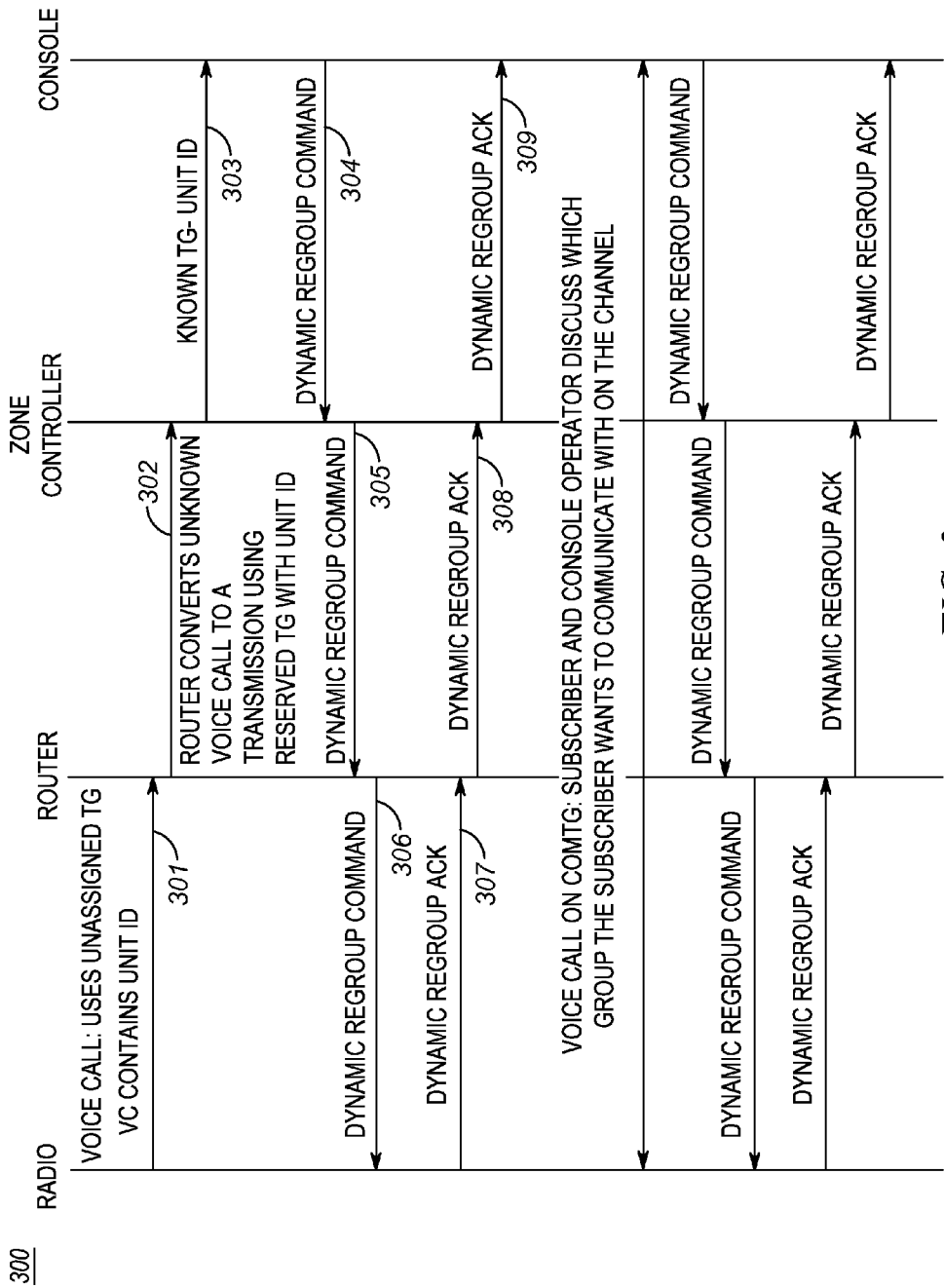
FIG. 3 is a call-flow diagram illustrating the present invention.

FIG. 3 is a call-flow diagram illustrating the present invention. A voice call using an unassigned talk group is transmitted on a channel (301). In response, router 105 converts the unknown voice call to a message having identification information on a reserved talk group (comTG) (302). A zone controller forwards the identification information using the reserved talk group (303). In response, a dynamic regroup command is transmitted from the console, and ultimately to the radio that made the original voice call using the unassigned talk group (304, 305, 306). As discussed above, the dynamic regroup command assigns the radio to the reserved talk group. The radio acknowledges the dynamic regroup command, which is forwarded to the console (307, 308, 309).

At this point the radio and the console are capable of communication using the reserved talk group transmitted on the channel. The radio and subscriber operator may discuss an appropriate talkgroup to be assigned to the radio and the radio may be re-programmed accordingly. This is illustrated in FIG. 3 with a second dynamic regroup command and acknowledgment being transmitted by the console and the radio, respectively.

Figure 4:
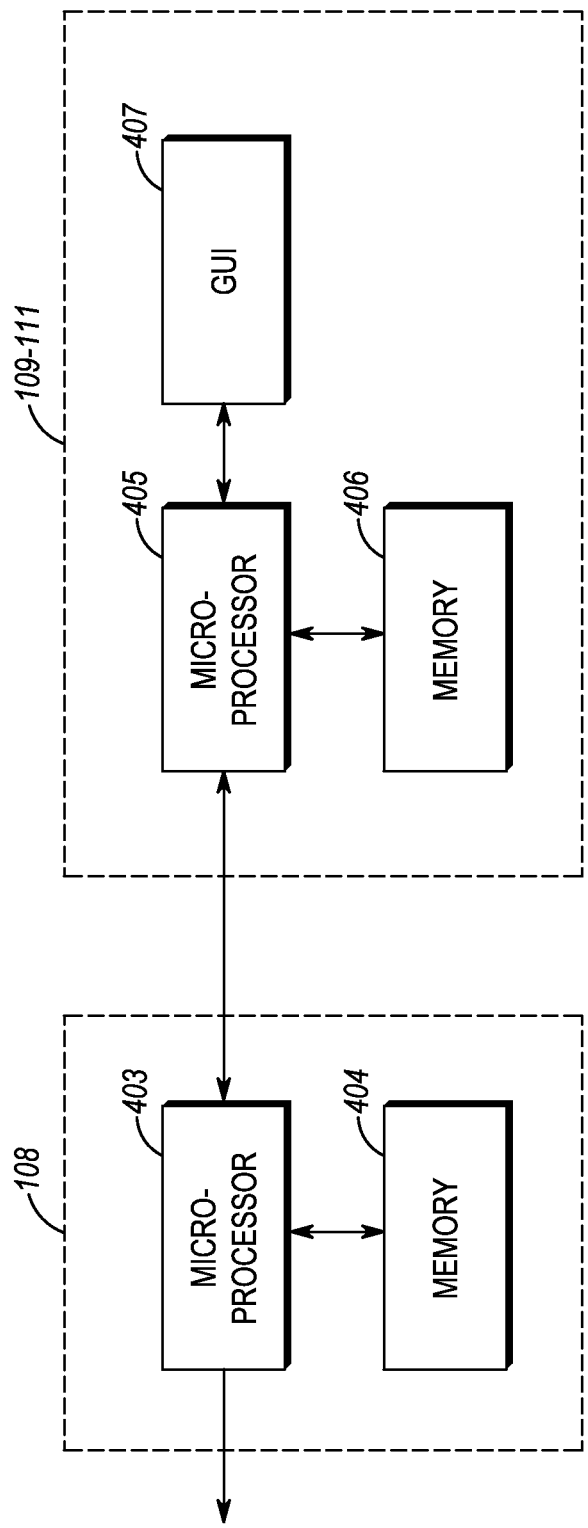
FIG. 4 is a block diagram of a zone controller and a console of FIG. 1.

FIG. 4 is a block diagram of a zone controller and a console of FIG. 1. As shown, zone controller 108 comprises microprocessor (logic circuitry) 403 and memory 404, while console 109-111 comprises microprocessor (logic circuitry) 405 and memory 406. Logic circuitry 403 and 405 comprise a digital signal processor (DSP), general purpose microprocessor, a programmable logic device, or application specific integrated circuit (ASIC) and is utilized to assign talk groups as described above. Memory 404 and 406 act as a database storing at least the information shown in FIG. 2 (channel/talk group associations) and comprises standard random access memory.

As is evident, console 109-111 also comprises graphical user interface (GUI) 407. GUI 407 receives an input from a user to initiate a dynamic regrouping of a particular radio. In addition, in an embodiment, GUI 407 provides a way of conveying (e.g., displaying) that a radio is using an unassigned talk group. In particular, in an embodiment, an alarm may be displayed to the user whenever a communication is received using the ComTG. In order to provide the above features (and additional features), GUI 407 may include a monitor, a keyboard, a mouse, and/or various other hardware components to provide a man/machine interface.

Figure 5:
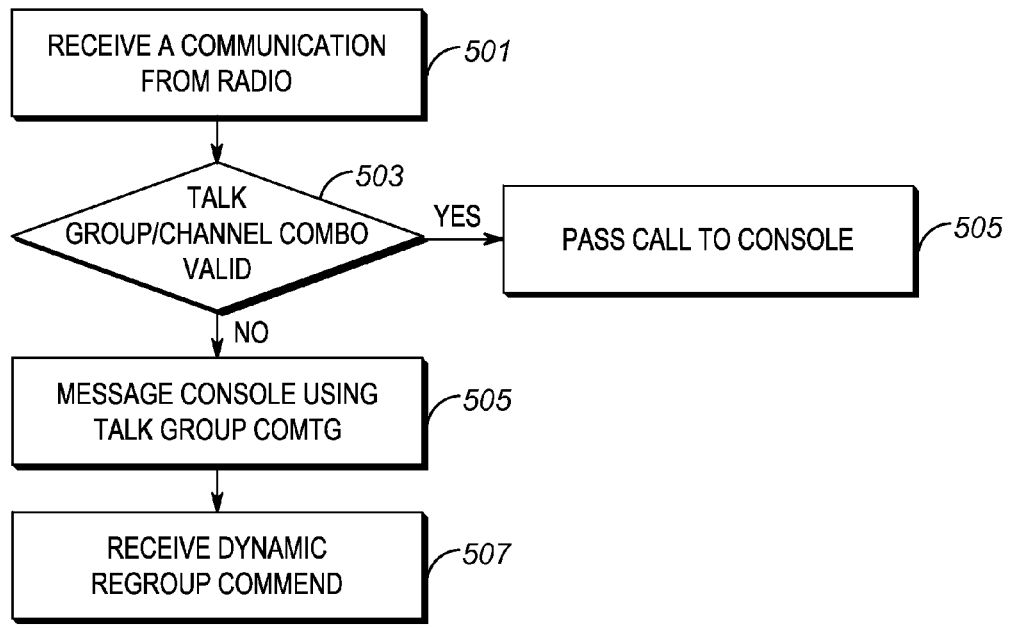
FIG. 5 is a flow chart showing operation of the router of FIG. 1.

FIG. 5 is a flow chart showing operation of router 105. The logic flow begins at step 501 where logic circuitry 403 receives a communication from a radio using a channel/talk group combination. At step 503, logic circuitry 403 determines if the talk group used for the communication is valid. In a first embodiment, where a conventional system is utilized, the step of determining that the talk group is valid comprises the step of determining that a talk group/channel combination is valid. In other words, logic circuitry 403 determines if the talk group is associated/assigned with the channel used for the communication. As discussed above, this is accomplished by accessing memory 404 and the lookup table shown in FIG. 2. In a second embodiment of the present invention, where a conventional system is utilized, this step may simply comprise the step of determining that an unrecognized talk group is being used, regardless of what channel the talk group is being used on. In a third embodiment of the present invention, where a trunking system is utilized, the step of determining the talkgroup is invalid controller 108 has no other users that are monitoring the talkgroup. (Note the zone controller can determine this because no other users have affiliated (have requested to use) to the talkgroup. Therefore a transmit by the trunking radio will not be heard by anyone.)

If the talk group is valid, then the logic flow continues to step 505 where the call is passed to console 109-111. If, however, it is determined that the talk group is invalid, then the logic flow continues to step 505 where logic circuitry 403 messages console 109-111 using a talk group reserved for this scenario. As discussed above, the message contains identification information for the radio. In response, at step 507 a dynamic regroup message is received by logic circuitry 403 for the identified radio and passed to the identified radio (through an intervening base station). The dynamic regroup message instructs the radio to utilize a known talk group for communications. In one embodiment of the present invention, the "known talk group" comprises the reserved talk group.

The logic flow of FIG. 5 results in a method for assigning a talk group to a radio within a communication system. The method comprises the steps of receiving a communication from a radio, the communication using a first talk group, determining that the talk group is invalid, transmitting a message using a reserved talk group, wherein the message comprises identification information for the radio, and wherein the message is transmitted in response to the step of determining that the talk group is invalid, and receiving a command to assign the radio to a second talk group in response to transmitting the message using the reserved talk group. As discussed, the reserved talk group is not assigned to any radio unless the radio communicates with an invalid talk group/channel combination.

Figure 6:
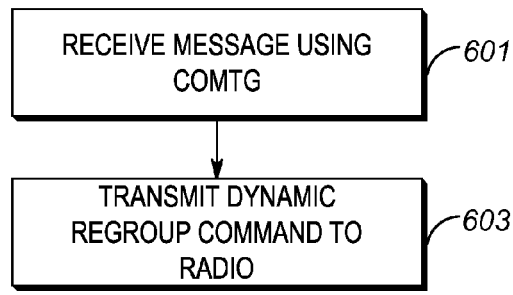
FIG. 6 is a flow chart showing operation of the console of FIG. 1.

FIG. 6 is a flow chart showing operation of console 109-111. The logic flow begins at step 601 where logic circuitry 405 receives a message using a reserved talk group (ComTG). As discussed above, the reserved ComTG is reserved for when a radio communicates with a talk group that is not assigned to a particular channel. Additionally, as discussed above, the message contains identification information for the radio making the communication. In response, a dynamic regroup command is transmitted to the identified radio assigning the radio a valid talk group. In one embodiment, the radio is assigned the ComTG (step 603). It should be noted that communications can then take place between the console and the radio on ComTG. These communications may result in another talk group being assigned to the radio (chosen from memory 406).

In the foregoing specification, specific embodiments have been described. However, one of ordinary skill in the art appreciates that various modifications and changes can be made without departing from the scope of the invention as set forth in the claims below. For example, in the above-described system once a talkgroup is used on one conventional talkgroup channel it is not used on another conventional talkgroup channel (e.g., talk group 11 is not used on both channel 23 and channel 24). However, in alternate embodiments of the present invention this may not need to be the case. Therefore, even though the reserved talk groups (ComTG and Channel Wide TG) use different talkgroup IDs on different channels, in alternate embodiments of the present invention, the same talk group ID may be used on separate channels. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for assigning a talk group to a radio within a communication system, the method comprising the steps of:
   receiving a communication from a radio, the communication using a first talk group;
   determining that the talk group is invalid;
   transmitting a message using a reserved talk group, wherein the message comprises identification information for the radio, and wherein the message is transmitted in response to the step of determining that the talk group is invalid; and
   receiving a command to assign the radio to a second talk group in response to transmitting the message using the reserved talk group
   wherein the step of determining that the talk group is invalid comprises at least one of:
   determining that a channel/talk group combination is invalid;
   determining that the talk group is not assigned to the channel; or
   determining that the talk group has no other users monitoring the talkgroup.

2. The method of claim 1 wherein the step of receiving the communication from the radio comprises the step of receiving the communication from the radio over a channel.

3. The method of claim 1 further comprising the step of:
   forwarding the command to the radio.

4. The method of claim 1 wherein the second talk group comprises the reserved talk group.

5. The method of claim 1 wherein the reserved talk group is not assigned to any radio unless the radio communicates with an invalid talk group/channel combination.

6. The method of claim 5 wherein the reserved talk group is not assigned to any radio unless the radio communicates with an invalid talk group/channel combination.

7. The method of claim 6 wherein the command comprises a dynamic regroup command.

8. A method for assigning a talk group to a radio within a communication system, the method comprising the steps of:
   receiving a message using a reserved talk group, the message containing identification information for a radio;
   in response to receiving the message using the reserved talk group, transmitting a command to the identified radio, assigning the radio a talk group;
   wherein the talk group assigned to the radio comprises the reserved talk group; and
   wherein the reserved talk group is not assigned to any radio unless the radio communicates with an invalid talk group/channel combination.

9. An apparatus comprising:
   logic circuitry receiving a communication from a radio, the communication using a first talk group, determining that the talk group is invalid, transmitting a message using a reserved talk group, wherein the message comprises identification information for the radio, and wherein the message is transmitted in response to the step of determining that the talk group is invalid, and receiving a command to assign the radio to a second talk group in response to transmitting the message using the reserved talk group;
   wherein the step of determining that the talk group is invalid comprises at least one of:
   determining that a channel/talk group combination is invalid;
   determining that the talk group is not assigned to the channel; or
   determining that the talk group has no other users monitoring the talkgroup.

10. The apparatus of claim 9 the communication from the radio is received over a channel.

* * * * *